3,117,168
ALKYLATED DI-p-XYLYLENES

William F. Gorham, Berkeley Heights, N.J., assignor to Union Carbide Corporation, a corporation of New York
No Drawing. Filed Aug. 19, 1960, Ser. No. 50,601
12 Claims. (Cl. 260—668)

This invention relates to substituted cyclic di-p-xylylenes, and more particularly, to alkylated cyclic di-p-xylylenes having from 1 to 6, inclusive, alkyl groups substituted on the aromatic nuclei.

This application is a continuation-in-part of my application Serial No. 622,249 filed November 15, 1956, now abandoned. In that application, there is disclosed a method of polymerization of various substituted p-xylylene polymers by the pyrolysis of a cyclic dimer of the structure.

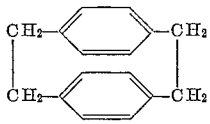

and which can have as many as six aromatic nuclear substituent groups, such as alkyl groups. The present invention concerns these alkylated di-p-xylylenes containing from 1 to 6 inclusive alkyl groups substituted on the aromatic nuclei as novel compositions of matter.

According to the present invention, it is now possible to prepare alkyl substituted cyclic di-p-xylylenes to contain as many as six alkyl substituents. Possibly because of steric hinderance or other effects at present unknown, it has not been possible to substitute alkyl groups in more than six of the eight positions of the aromatic rings of the di-p-xylylene, although with small selected groups such as methyl, it may be possible to prepare the octamethyl di-p-xylylene. It has also been found that the aliphatic carbon atoms of the di-p-xylylene will not alkylate and that all substituent groups are on the aromatic nuclei.

The alkylated di-p-xylylenes of this invention can be produced by either of two methods.

The first method involves the reduction reaction of an acylated di-p-xylylene according to the following scheme

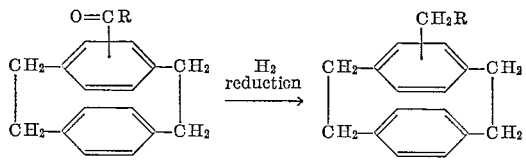

wherein R is a straight or branched aliphatic, alicyclic, aryl or aralkyl hydrocarbon radical. Thus, for the purpose herein set forth, the "alkyl" substituents on the di-p-xylylene includes those groups of straight and branched chain aliphatic, alicyclic and aralkyl hydrocarbons wherein the hydrocarbon group is attached to the aromatic nuclei through an aliphatic carbon atom, all of which for the purposes herein set forth are termed "alkyl."

This reaction is readily conducted in a reducing medium with free hydrogen. Preferably it is conducted using a free metal such as amalgamated zinc with a hydrogen-liberating acid, such as hydrochloric acid, sulfuric acid, phosphoric acid and the like. Temperatures of 50° to 100° C. are preferred for this reaction although it will be recognized by those skilled in the art that higher or lower temperatures can be employed.

While this process can be employed to get as many as six alkyl substituents on the aromatic nuclei of the di-p-xylylene, it is necessary that in placing each alkyl group on the aromatic nuclei, a separate acylation and reduction reaction must be employed. However, after each acyl group is reduced to the alkyl group, it remains essentially inert and the alkyl di-p-xylylene can be again acylated to place another acyl group on the aromatic nuclei which is then itself reduced to the alkyl group, according to the following reaction

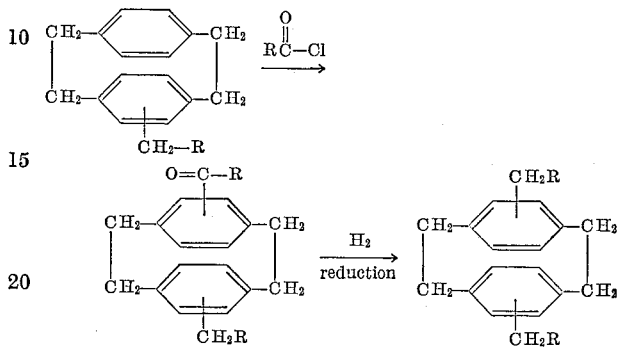

Thus, by this technique successive reactions can yield as many as six alkyl groups on the aromatic nuclei and possibly more. This technique also provides for placing different alkyl groups on the di-p-xylylene if desired. Thus, this invention is not limited to all of the alkyl groups being of the same size or type. Thus, some can be straight or branched chain alkyl groups having the formula $(C_nH_{2n+1})$ while others are aralkyl groups having the formula $—(CH_2)_nAr$ where Ar is an aromatic carbocyclic group and $n$ is an integer from 1 to 5 or even alicyclic alkyl groups such as cyclohexylmethylene, cyclopentylmethylene, cycloheptylmethylene.

In this technique, it is only necessary that the starting material have an acyl group attached to the di-p-xylylene. This can easily be accomplished by reacting the di-p-xylylene with an acyl halide of the formula

where R is a hydrocarbon group and X is a halogen. The acylation reaction is conventionally carried out by admixing the acyl halide, preferably the acyl chloride with the di-p-xylylene at a temperature of −30 to 0° C., in the presence of aluminum chloride.

While it is not critical that the alkyl groups be limited to any particular number of carbon atoms, the lower alkyl groups containing up to about eight carbon atoms are preferred because of the ease of the reaction of the respective acyl chloride. Such groups illustrative of this preferred class are ethyl, propyl, isopropyl, n-butyl, sec. butyl, hexyl, octyl, benzyl, ethyl-hexyl, ethyl-cyclohexyl, cyclo-hexylmethylene.

Another process which provides these alkylated di-p-xylylenes is by direct alkylation in the presence of aluminum chloride with an alkyl halide at low temperatures, according to the following scheme.

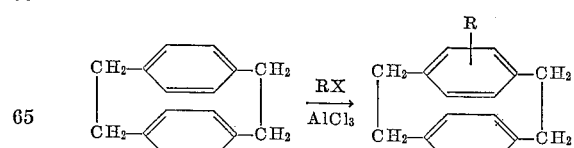

where R is the alkyl group and X is a halogen.

While this reaction is also stepwise, i.e. only one alkyl group adds on in the reaction, it is preferred over the acylation-reduction process since one reaction is eliminated. In addition, high yields and high purity of the alkylated di-p-xylylene are secured to make this procedure a simple, direct and economic process. Subsequent alkylation of the aromatic nuclei proceeds as follows

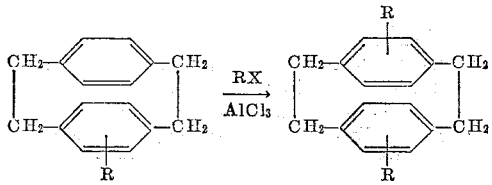

where R is the alkyl group, X is halogen.

As with the acylation-reduction reaction, it is possible to employ different alkyl halides so that the substituent groups are different alkyl groups.

In both of these processes, low temperatures are necessary. At temperatures above 0° C. the aluminum chloride starts to attack the di-p-xylylene. At temperatures much below —30° C. the reaction rate is quite slow and is impractical. Preferably, temperatures from about —5° C. to —25° C. are employed.

Any inert organic material which is liquid at the reaction temperatures can be employed as the reaction medium. It is not critical that the liquid be a solvent for the di-p-xylylene inasmuch as the reaction has been found to readily proceed whether the di-p-xylylene is in solution or suspension. Suitable reaction media are s-tetrachloroethane, nitrobenzene, carbon di-sulfide, chlorobenzene and other similar vehicles can be employed which are inert at the reaction temperatures. It is desirable however to employ a liquid in which either the alkyl halide or the final product or both are soluble.

Any alkyl halide can be employed as the alkylating agent in this invention. While the alkyl chlorides are preferred for the reaction, any of the other alkyl halides, i.e. bromides, iodides, etc. can be employed if desired. The term "alkyl halides" as used herein also includes straight and branched chain aliphatic, alicyclic and aralkyl compounds wherein the halogen atom is attached to an aliphatic carbon atom. Thus, while it is not critical that the alkyl halide be limited to any particular number of carbon atoms, the lower alkyl halides containing up to about eight carbon atoms are preferred because of the ease of reaction of the alkyl halide. Such groups as are illustrative of this preferred class are methyl, ethyl, propyl, isopropyl, n-butyl sec. butyl, hexyl, octyl, cyclohexyl and benzyl.

It is also possible in this process to form the alkyl halide in situ if desired by using the appropriate olefin and hydrogen halide. For example, the reaction proceeds equally as well with ethyl chloride as it does using a mixture of ethylene and hydrogen chloride.

The reaction proceeds on an equimolar basis of di-p-xylylene and the alkyl halide. Excess amounts of the alkyl halide over about two moles per mole of di-p-xylylene do not appear to result in further or faster alkylation and thus serve no practical purpose. However, there is no theoretical upper limit of the alkyl halide other than considering the economics of the process. It is also not critical that the alkyl halide be added all at once. It can, if desired, be slowly added during the course of the reaction.

Preferably, equimolar amounts of the alkyl halide and aluminum chloride are employed, although the molar ratio of aluminum chloride to alkyl halide can range from 0.5:1 to 1:1. As with the alkyl halide, excess amounts of aluminum chloride over this ratio can be employed as long as the reaction is conducted at a low temperature to prevent the aluminum chloride from attacking the di-p-xylylene.

It is not critical in either of these processes that the starting material be only di-p-xylylene, since as discussed heretofore, inert groups such as alkyl groups from previous alkylations can be present. Any other inert groups can also be present on the aromatic nuclei such as halogens, e.g. chlorine bromine, hydroxyl, amino, nitro and the like as long as the total of all groups on the di-p-xylylene product is not more than six. As would be expected from the possible steric effects of substituent groups, it is relatively easy to put three or four large alkyl groups on the aromatic nuclei, however, the placement of five and six large alkyl groups becomes progressively more difficult with larger groups. With smaller groups such as methyl and ethyl, even six substituents are relatively easy by repetitive reaction and even eight substituents is possible with methyl groups.

The following examples are illustrative of this invention but are not to be considered as a limitation thereof.

EXAMPLE I

*Preparation of Sec.-Butyl Di-Xylylene*

In a 1000 ml. three-necked flask equipped with stirrer, reflux condenser, and addition tube was placed 200 ml. s-tetrachloroethane and 6.75 g. (0.05 mole) of aluminum chloride. The flask was immersed in a Dry Ice-acetone bath which was maintained at —30° C. A total of 10.4 g. (0.05 mole) of di-p-xylylene was then added. The mixture was stirred and a solution of 13.7 g. (0.1 mole) of sec.-butyl bromide in 50 ml. of s-tetrachloroethane added over a 25 minute period. The reaction mixture, which turned a deep crimson, was stirred for one hour at —10 to —30° C. The reaction was terminated by addition of 100 ml. of 1 N hydrochloric acid and solution warmed to room temperature. The organic layer was washed with 200 ml. of 10% sodium bicarbonate solution, 200 ml. of water, and dried over magnesium sulfate. The solvent was removed by atmospheric distillation and the product purified by short path distillation. A total of 13 g. of product, B.P. 140–170° C. at 0.1 mm., was obtained. The product partially solidified on cooling. The liquid portion was dissolved in 70 ml. of 60/40 benzene/ether solution. The solid portion was recovered by filtration. This amounted to 0.85 g., exhibited M.P. 260–284° C., and was largely unreacted di-p-xylylene. The benzene-ether solution containing the major product was concentrated and redistilled. A total of 10.6 g. of product B.P. 145–170° C. at a 0.1 mm., was obtained. Vapor phase chromatographic analysis indicated a composition of 3% di-p-xylylene, 92% mono-sec.-butyl di-p-xylylene and 5% higher boiling products.

EXAMPLE II

*Preparation of Ethyl Di-p-Xylylene*

(A) *Using ethyl bromide or ethyl chloride.*—In a dry three-necked flask, equipped with a drying tube, a thermometer and an efficient stirrer, there were placed 3.4 g. (0.025 mole) of anhydrous aluminum chloride, 50 ml. of dry sym-tetrachloroethane and 8.5 ml. (0.113 mole) of ethyl bromide (or equivalent ethyl chloride). The mixture was cooled to —15° C. To the cooled mixture was added 2.6 g. (0.0125 mole) of di-p-xylylene. The mixture was stirred at —10° C. to —15° C. for an hour. After the reaction period, the mixture was cooled to the temperature of —30° C. and 15 ml. of 1 N aq. hydrochloric acid was added dropwise to the mixture with vigorous stirring. The mixture was then slowly brought to room temperature with vigorous stirring. After separating the aqueous layer, the organic layer was washed successively with aq. sodium bicarbonate, water and then was dried (sodium sulfate). After the removal of the solvent, the crude product was dissolved in n-heptane and the unreacted di-p-xylylene was removed by filtration. The n-heptane solution was concentrated to dryness and the crude product was purified first by sublimation and then by recrystallization from 95% ethanol. Yield, 2.5 g. (85%), M.P. 110–111° C. A small portion of the product was recrystallized from 95% ethanol to give an analytically pure sample, M.P. 111–112° C.

*Analysis.*—Calcd. for $C_{18}H_{20}$: C, 91.53; H, 8.47. Found: C, 91.51; H, 8.54.

(B) *Using a mixture of ethylene and hydrogen chloride.*—A cooled mixture ($-15°$ C.) of 3.4 g. (0.025 mole) of anhydrous aluminum chloride in 50 ml. of sym-tetrachloroethane was saturated with ethylene and hydrogen chloride in separate streams with vigorous stirring. After the saturation, 2.6 g. (0.0125 mole) of di-p-xylylene was added all at once to the cooled mixture and the mixture was stirred for an hour at $-10°$ C. to $-15°$ C. The rest of the procedure is identical with procedure A. Yield, 60–70% of a product identical with that obtained in A.

EXAMPLE III

*Preparation of Diethyl Di-p-Xylylene*

The procedure used in this preparation starting with ethyl di-p-xylylene (90% purity) was similar to the procedure used for the preparation of ethyl di-p-xylylene from di-p-xylylene except the purification step. The initial crude product, obtained after the removal of sym-tetrachloroethane, was distilled at 140°–180° C. at 0.5 mm. (Hg). The distillate, weighing 2.8 g. (85%) was analyzed by vapor phase chromatography to contain 29% of ethyl di-p-xylylene, 68% of diethyl di-p-xylylene (two isomers, $$\frac{\text{monosubstitution in both rings}}{\text{disubstitution in one ring}} = \frac{6}{1} \text{ ratio}\Big)$$

The pyrolytic polymerization of this product gave mostly polyethyl-p-xylylene which was identified by infrared spectrum.

EXAMPLE IV

*Preparation of Other Alkyl Di-p-Xylylenes*

The procedure used for these preparations were essentially uniform and similar to the procedure outline in Example I or Example II.

(A) *Benzyl-di-p-xylylene.*—Procedure similar to Example I. Only 1 mole of benzyl chloride was used for each mole of di-p-xylylene. The impure benzyl di-p-xylylene was dissolved in a small amount of benzene to remove unreacted di-p-xylylene, distilled and then recrystallized from 95% ethanol. Yield 51%, M.P. 134–135° C.

*Analysis.*—Calcd. for $C_{23}H_{22}$: C, 92.62; H, 7.38. Found: C, 92.46; H, 7.41.

(B) *Cyclohexyl di-p-xylylene.*—Procedure similar to Example I. The impure cyclohexyl di-p-xylylene was dissolved in n-heptane to remove unreacted di-p-xylylene, distilled and then recrystallized from 95% ethanol. Yield 90%, M.P. 75–77° C.

*Analysis.*—Calcd. for $C_{22}H_{26}$: C, 91.03; H, 8.97. Found: C, 90.86; H, 9.16.

(C) *N-propyl di-p-xylylene.*—Procedure similar to Example II except that n-propyl bromide was added to the cooled mixture ($-15°$ C.) to avoid rearrangement. Yield 69%, M.P. 74–74.5° C., identical with the product obtained from the reduction of propionyl di-p-xylylene.

(D) *Isopropyl di-p-xylylene.*—Procedure similar to Example I. The crude product was dissolved in n-heptane to remove unreacted di-p-xylylene, sublimed and then recrystallized from 95% ethanol. Yield, 90%, M.P. 125–126° C.

(E) *Ethyl chloro di-p-xylylene.*—Procedure similar to Example II starting with crude chloro di-p-xylylene (70.6% monochloro di-p-xylylene, 15.9% dichloro di-p-xylylene, 13.5% di-p-xylylene). The crude product was purified by distillation. The vapor phase chromatography of the distillate indicated that it has the following composition: Ethyl chloro di-p-xylylene 72.6%, chloro di-p-xylylene 6.8%, ethyl di-p-xylylene 5%, di-p-xylylene 1.6%, unknown 14%.

EXAMPLE V

*Preparation of Poly-Ethyl-p-Xylylene*

2-ethyl-di-p-xylylene was prepared by the reduction involving a reaction between 3.8 grams of acetyl-di-p-xylylene, 30 ml. of glacial acetic acid, 30 ml. of concentrated hydrochloric acid with 12 grams of amalgamated zinc. The above mixture was refluxed, and at the end of an hour, 30 ml. each of glacial acetic acid and concentrated hydrochloric acid were added. After a short time the solution became red, then turned colorless, and later an oil separated. In all, the mixture was refluxed 5 hours. The mixture was cooled, diluted with 200 ml. of water and extracted with 150 cc. of benzene. The benzene layer was washed with water, concentrated and dried. The product was purified by vacuum distillation. It amounted to 2.3 grams (65 percent yield) of 2-ethyl-di-p-xylylene having a melting point of 100° C. to 108° C. and a boiling point of 160° C. to 180° C. (0.3 mm.). One gram of the above product was distilled over four minutes through a pyrolysis chamber kept at 575° C. and 0.3 mm.

Pyrolysis of this at 575° C. resulted in cleavage to p-xylylene and 2-ethyl-p-xylylene diradicals. The 2-ethyl-p-xylylene diradicals polymerized in a polymerization zone maintained at 90° C. to give 0.55 gram of poly-ethyl-p-xylylene having a melting point of about 180° C.

EXAMPLE VI

In a 500 ml. three-neck flask equipped with stirrer, calcium chloride tube, and stopper was placed 9.5 grams of aluminum chloride, 125 ml. of s-tetrachloroethane, and 8.5 grams of n-butyryl chloride. The mixture was cooled to $-30°$ C. and 7.5 grams of di-p-xylylene added. The solution was stirred at $-15°$ C. to $-20°$ C. for twenty minutes, cooled to $-30°$ C. and 50 ml. of 1 N hydrochloric acid added. The solution was allowed to warm up to room temperature. The mixture was transferred to a separatory funnel, 100 ml. of water added and the aqueous layer containing inorganic salts was extracted from the organic layer. The organic layer was separated, washed with 150 ml. of 3 percent sodium bicarbonate solution, 100 ml. of water and dried. The solvent was removed by distillation and the product purified by vacuum distillation. A total of 6.7 grams (66 percent yield) of 2-butyryl-di-p-xylylene having a boiling point of 160° C.–170° C. at 0.15 mm., and a melting point of 88° C.–93° C., was obtained. The compound exhibited a characteristic infra-red spectrum for 2-butyryl-di-p-xylylene and which was comparable to the spectrum of 2-acetyl-di-p-xylylene. The reaction can be illustrated as follows:

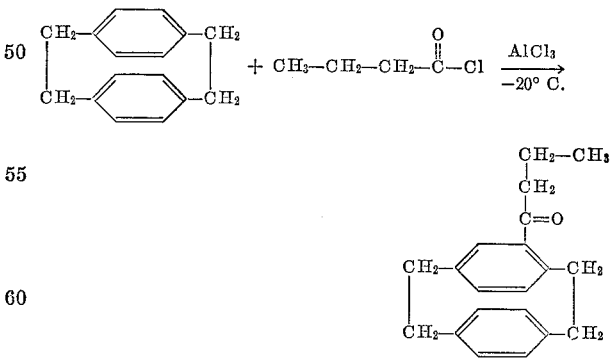

In a 250 ml. flask was placed 10 grams of amalgamated zinc, 125 ml. of glacial acetic acid, 15 ml. of concentrated hydrochloric acid, and 5 grams of 2-butyryl-di-p-xylylene. The solution was heated to reflux for two days. The solution was intermittently resaturated with anhydrous hydrogen chloride. At the end of this period the hot solution was transferred to a flask containing a new 10 gram portion of amalgamated zinc. The reduction process was repeated for an additional 24 hours. The mixture was transferred to a separatory funnel and the product extracted into benzene. The benzene layer was washed and dried. The benzene was removed by atmospheric distillation and the product purified by vacuum distillation. A total of 1.16 grams of n-butyl-di-p-xylylene, having a boiling point of 150° C. at 0.1 mm., and a melting point of 65° C.–68° C. was obtained.

EXAMPLE VII

In a 250 ml. three-neck flask equipped with stirrer, calcium chloride tube, and stopper was placed 200 ml. of s-tetrachloroethane, 10.8 grams of anhydrous aluminum chloride, and 13 grams of benzoyl chloride. Stirring was commenced and the flask immersed in a Dry Ice acetone bath at —20° C. to —25° C. 10.8 grams of di-p-xylylene was added in one portion and the mixture stirred at —20° C. to —25° C. for one hour. The catalyst was then decomposed by addition of 100 ml. of 1 N hydrochloric acid. The organic layer was separated and washed successively with 100 ml. of water, 100 ml. of water. The organic layer was dried and the solvent removed by vacuum distillation. The product was distilled through a short path column and had a boiling point of 200° C.–215° C. at 0.3 mm. The product was triturated with ether, and the ether solution filtered to recover a small amount of unreacted di-p-xylylene. On evaporation of the ether a total of 12.08 grams (78 percent yield) of benzoyl-di-p-xylylene, M.P. 118° C.–120° C. was obtained. After recrystallization from methanol the material had a melting point of 122° C.–123° C. The reaction can be represented by the following scheme:

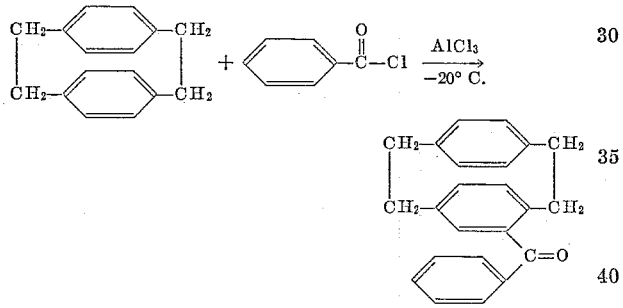

In a 250 ml. flask was placed 10 grams of amalgamated zinc, 100 ml. of glacial acetic acid, 2.5 grams of benzoyl-di-p-xylylene, and 15 ml. of cencentrated hydrochloric acid. The solution was heated to reflux and resaturated with anhydrous hydrogen chloride at the end of every hour for a total of six hours. The mixture was then heated to reflux over night. The liquid products were transferred into a separatory funnel and the organic products extracted into 100 ml. of benzene. The benzene layer was separated, washed, and dried. The benzene was removed by atmospheric distillation and the product purified by vacuum distillation. The product had a boiling point of 180° C.–200° C. at 0.3 mm. and was recrystallized from aqueous ethanol. A total of 0.55 gram of pure 2-benzyl-di-p-xylylene, M.P. 135° C.–136° C. was obtained.

What is claimed is:
1. An alkylated cyclic di-p-xylylene having the structure:

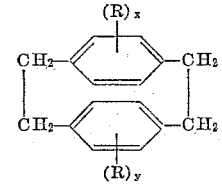

wherein R is an alkyl group having from 1 to 8 carbon atoms and $x$ and $y$ are integers such that $x+y$ can vary from 1 to 6.
2. Mono-alkyl di-p-xylylene where the alkyl group contains from 1 to 8 carbon atoms and is attached to a carbon atom of an aromatic nucleus.
3. Di-alkyl di-p-xylylene where each alkyl group contains from 1 to 8 carbon atoms and is attached to a carbon atom of an aromatic nucleus.
4. Trialkyl di-p-xylylene where each alkyl group contains from 1 to 8 carbon atoms and is attached to a carbon atom of an aromatic nucleus.
5. Ethyl-di-p-xylylene.
6. n-Propyl-di-p-xylylene.
7. Isopropyl-di-p-xylylene.
8. n-Butyl-di-p-xylylene.
9. sec-Butyl-di-p-xylylene.
10. Benzyl-di-p-xylylene.
11. Ethyl chloro-di-p-xylylene.
12. Diethyl-di-p-xylylene.

References Cited in the file of this patent
UNITED STATES PATENTS

| | | |
|---|---|---|
| 2,719,131 | Hall | Sept. 27, 1955 |
| 2,769,786 | Szwarc et al. | Nov. 6, 1956 |

FOREIGN PATENTS

| | | |
|---|---|---|
| 673,651 | Great Britain | June 11, 1952 |

OTHER REFERENCES

Brown et al.; Nature, vol. 164 (1949), pp. 915–916.
Farthing: Chemical Society Journal, 1953, part 3, pages 3261–3264.
Brown: Chemical Society Journal, 1953, part 3, pages 3265–3270.
Cram et al.: JACS, vol. 77, pp. 6289–6294, 1955.